(12) United States Patent
Hsieh et al.

(10) Patent No.: US 7,362,567 B1
(45) Date of Patent: Apr. 22, 2008

(54) NOTEBOOK COMPUTER EXPANSION BASE WITH SLIDABLE COVER STRUCTURE

(75) Inventors: Ming-Chan Hsieh, Taipei (TW); Yi-Hsun Hung, Taipei (TW); Chia-Min Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/710,719

(22) Filed: Feb. 26, 2007

(51) Int. Cl.
*H05K 5/00* (2006.01)

(52) U.S. Cl. ............ 361/686; 710/303; 710/304; 312/223.1; 312/223.2

(58) Field of Classification Search ........ 361/679–686; 710/303, 304; 312/223.1, 223.2
See application file for complete search history.

(56) References Cited

U.S. PATENT DOCUMENTS 5,751,546 A * 5/1998 Clark et al. .............. 361/686
6,028,767 A * 2/2000 Lan ......................... 361/686
6,833,988 B2 * 12/2004 Kamphuis et al. ........ 361/681
7,038,908 B2 * 5/2006 Usui et al. ............... 361/686

\* cited by examiner

*Primary Examiner*—Jayprakash N Gandhi
*Assistant Examiner*—Anthony Q Edwards
(74) *Attorney, Agent, or Firm*—Morris Manning Martin LLP; Tim Tingkang Xia, Esq.

(57) ABSTRACT

A notebook computer expansion base with a slidable cover structure is provided, which is applicable for the expansion of various types of notebook computers. Each notebook computer has an expansion joint and a plug specification, and the expansion base includes a base and a slidable cover. The base has an expansion component and an expansion slot electrically connected to each other, and the expansion slot is connected with the expansion joint directly, such that the expansion component is electrically connected with the notebook computer, so as to expand the expansion component to the notebook computer. The slidable cover is disposed on the base and being sildable, corresponding to a plugging reference, and the distance between the slidable cover and the expansion slot is adjusted through sliding the slidable cover, so as to be applicable for different plug specifications.

7 Claims, 13 Drawing Sheets

NOTEBOOK COMPUTER EXPANSION BASE WITH SLIDABLE COVER STRUCTURE

BACKGROUND OF THE INVENTION

1. Field of Invention

The present invention relates to a notebook computer expansion base with a slidable cover structure, and more particularly to an expansion base suitable for notebook computers having different plug specifications by way of adjusting the distance between the slidable cover and an expansion slot through sliding the slidable cover.

2. Related Art

Figure 1:
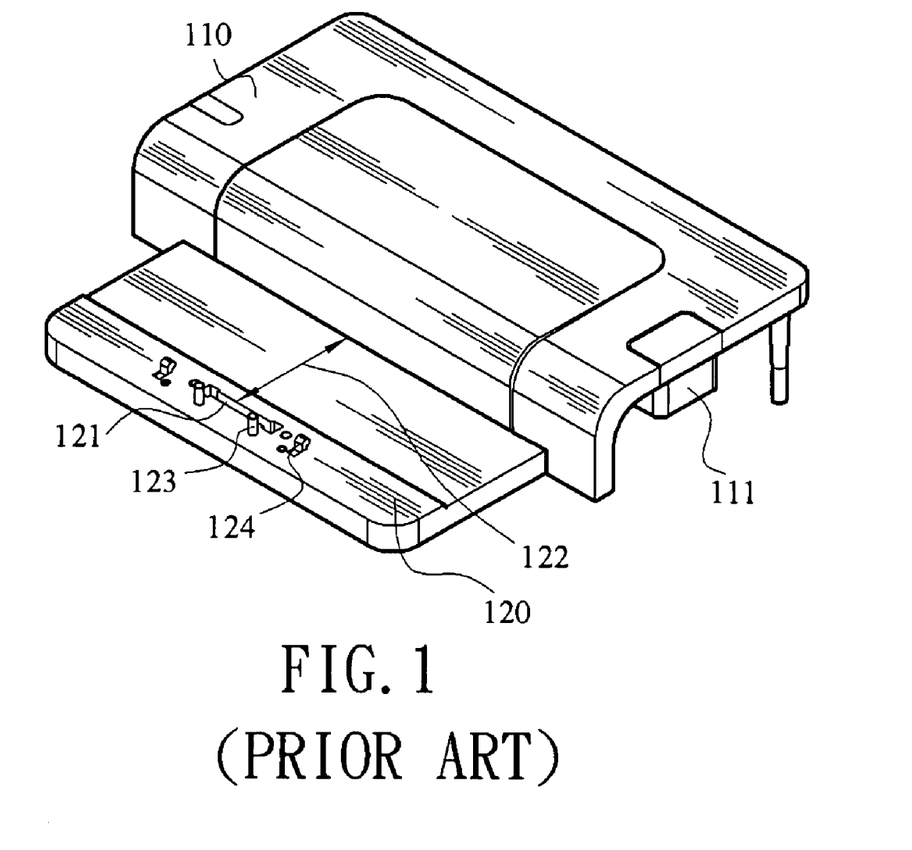
FIG. 1 is a schematic structural view of the prior art.

Referring to FIG. 1, it shows an expansion base of a conventional notebook computer. Generally, this type of expansion base includes an expansion portion 110 and a plug portion 120. The expansion portion 110 is used to accommodate at least one expansion unit 111, and the expansion unit 111 is an additionally disposed expansion component, such as a floppy drive, an optical disc drive, or a battery. The plug portion 120 is a portion for the expansion base to be plugged into the notebook computer, and it generally has a plug slot 121 electrically connected with the expansion unit 111, so as to form an electrical connection between the notebook computer and the expansion unit 111. Furthermore, a fixed plug gap 122 is reserved between the space between the plug portion 120 and the expansion portion 110 and the plug slot 121 for the notebook computer to be configured for plugging. In addition, in order to fix the expansion base on the notebook computer more firmly, a positioning element 123 and a buckling element 124 corresponding to each other are respectively disposed on the plug portion 120 and the notebook computer, such that the expansion base is firmly plugged to the notebook computer.

However, this method has an unavoidable defect, that is, the length of the fixed plug gap is definitely a fixed value, and thus, after being designed and formed, the expansion base only can be disposed on the notebook computer with a specific plug specification. If it is used to the notebook computer with a different plug specification, the expansion base cannot be mounted due to an insufficient fixed plug gap, or even through the expansion portion is mounted on the notebook computer, the expansion portion and the notebook computer do not press against each other and a redundant space is formed due to an excessive large length of the fixed plug gap, and thus, the expansion base tends to shake or fall off due to the unstable center of gravity and being crashed by an external force. Moreover, the positioning structure, the buckling structure, and the plug slot are easy to be damaged.

SUMMARY OF THE INVENTION

Accordingly, in order to solve the above problems, to maintain the original functions of a common expansion base, and to enlarge the adaptability of the expansion base such that expansion base can be plugged to notebook computers with different plug specifications, the present invention provides a notebook computer expansion base with a slidable cover structure. A slidable cover is additionally disposed on the expansion base, such that when the expansion base is plugged to the notebook computer, the area of a plug portion for the expansion base and the length of the plugging distance can be changed by sliding and positioning the slidable cover, so as to make the expansion base be firmly plugged on the notebook computers, matching with the plug specifications of the notebook computers.

The present invention provides a notebook computer expansion base with a slidable cover structure, applicable for the expansion of one of a plurality of notebook computers in different types. Each notebook computer has an expansion joint, a plugging reference, and a plugging distance (generally, the plugging reference and the plugging distance are known as a plug specification), and the plugging distance is a distance between the expansion joint and the plugging reference. The notebook computer expansion base includes a base and a slidable cover, wherein the base is used to accommodate at least one expansion component and has an expansion slot. The expansion component is electrically connected with the expansion slot, and the expansion slot is used to connect with the expansion joint, such that an electrical connection is formed between the expansion component and the connected notebook computer, thereby extending the expansion component to the notebook computer. The slidable cover is disposed on the base and being sildable corresponding to the plugging reference, and the slidable cover slides between at least a first position and a second position, such that different plugging distances are formed between the slidable cover and the expansion slot, so as to cater to different plug specifications, and thus the expansion base can be plugged to the notebook computers in different specifications.

The structure for the slidable cover to slide on the base includes a guiding element disposed on the base, which can be a guiding rail. The slidable cover includes at least one guiding block, the position of the guiding block is corresponding to the position of the guiding rail, and the guiding rail is used to accommodate the guiding block for the guiding block to slide therein, thereby guiding the slidable cover to slide between the first position and the second position. Secondly, the guiding rail can be provided with a plurality of positioning cavities disposed corresponding to the first position and the second position. The guiding block includes at least one positioning flange, such that when the slidable cover shifts to the first position and the second position, the slidable cover is positioned at the first position and the second position by engaging the positioning flanges in the positioning cavities. The slidable cover can further move to a third position between the first position and the second position, and similarly, the slidable cover is positioned at the third position by engaging the positioning flanges in the positioning cavities. Thirdly, the base includes at least one assisting rail, and the slidable cover includes at least one assisting rib. The position of the assisting rib is corresponding to the position of the assisting rail, and the assisting rail is used to accommodate the assisting rib for the assisting rib to slide therein, thereby guiding the slidable cover to slide between the first position and the second position. Fourth, the base includes a plurality of positioning blocks corresponding to the first position and the second position, the slidable cover includes a platen and a catch element, and the platen drives the catch element to move between a catch position and a release position upon being applied with a force, wherein when the catch element is at the catch position, the slide block is limited to moving between the first position and the second position, and when the catch element is at the release position, the slide block is able to move between the first position and the second position. Fifth, the expansion component can be a serial port hole, a battery, an optical disc drive, a floppy drive, or an expanded hard disk drive.

The present invention has efficacies that cannot be achieved by the prior art, that is, the plugging distance of the expansion base itself is changed by sliding the slidable cover, such that the expansion slot is corresponding to the expansion joint, and the slidable cover is corresponding to the plugging reference and presses against the plugging reference, and thus the expansion base can be closely engaged to different types of notebook computers in different expansion plug specifications, so as to avoid the circumstances that it cannot be plugged or an unstable center of gravity occurs due to an excessive long plugging distance, and to enhance the tightness of the plugging by additionally disposing a positioning structure and a buckling structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to further understand the objectives, construction features, and functions of the present invention, the present invention is illustrated below in detail through relevant embodiments and accompanying drawings.

Figure 2:
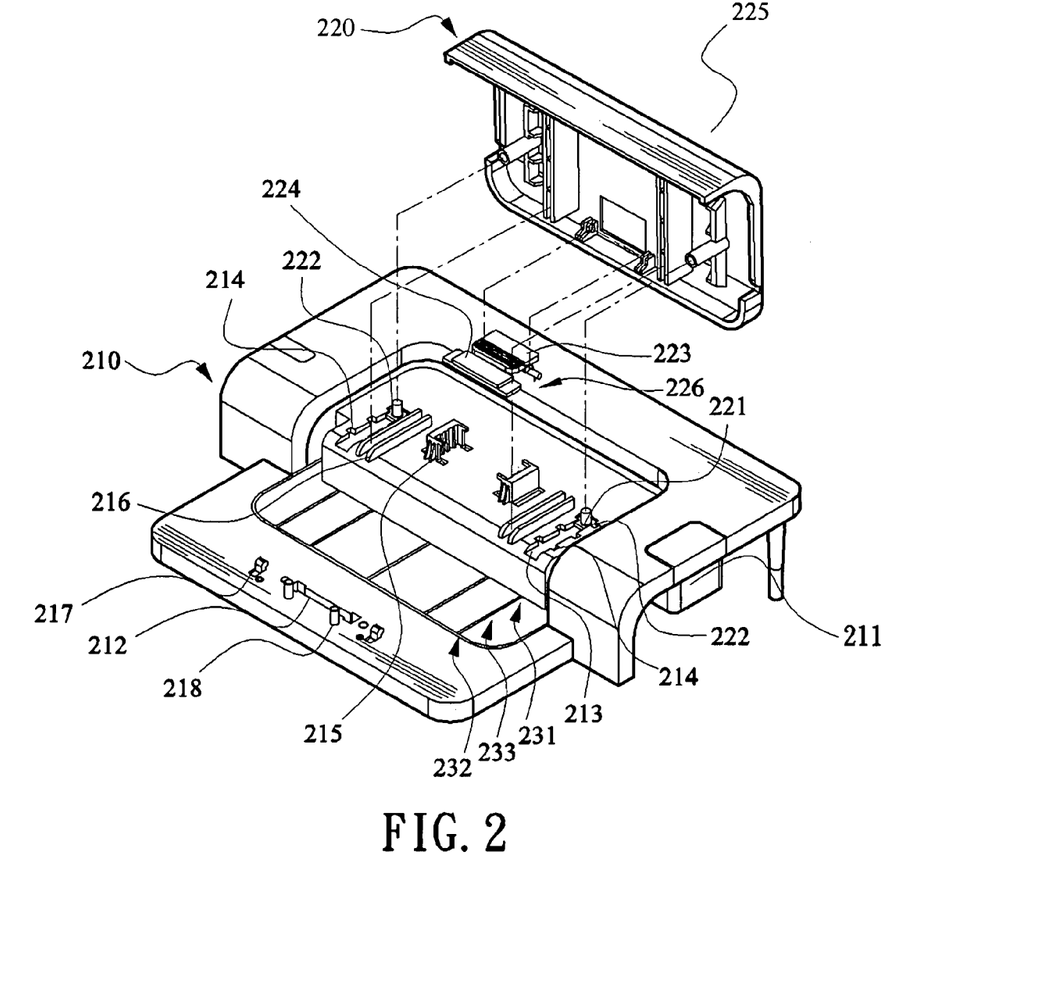
FIG. 2 is a schematic structural view of an expansion base according to the present invention.

Referring to FIG. 2, it is a schematic structural view of an expansion base according to the present invention. The expansion base mainly includes a base 210 and a slidable cover 220. The slidable cover 220 is disposed above the base 210 and slides between a first position 231 and a second position 232. The base 210 itself is used to accommodate an expansion component 211, and is provided with an expansion slot 212 at the portion where it is plugged with the notebook computer, in which the expansion slot 212 is electrically connected to the expansion component 211. The base 210 is further provided with a guiding element, and in this embodiment, the guiding element is, for example, a guiding rail 213. The slidable cover 220 is disposed with a guiding block 221 with a position corresponding to the position of the guiding rail. The guiding rail 213 is used to accommodate the guiding block 221 for the guiding block 221 to slide therein, so as to guide the slidable cover 220 to slide between the first position 231 and the second position 232.

Moreover, in order to make the slidable cover 220 be well positioned when moving to the target position, a positioning element can be disposed on the guiding element, for example, a plurality of positioning cavities 214 is disposed on the guiding rail 213. The positioning cavities 214 are corresponding to the first position 231 and the second position 232, and the guiding block 221 is provided with at least one positioning flange 222, such that when the slidable cover 220 moves to the first position 231 and the second position 232, the positioning cavity 214 can be used to accommodate the positioning flange 222, thereby positioning the slidable cover 220. However, besides the first position 231 and the second position 232, the slidable cover 220 also can be positioned at a third position 233 between the first position 231 and the second position 232 during the shifting process of the slidable cover 220, through the same manner of engaging the positioning flange in the positioning cavity.

However, in addition to the guiding element, an assisting rail 216 is further disposed on the base 210, and an assisting rib 225 with a position corresponding to the position of the assisting rail 216 is further disposed on the slidable cover 220. When the slidable cover 220 is covered on the base 210, the assisting rib 225 is accommodated within the assisting rail 216, so as to utilize the sliding of the assisting rib to assist the slidable cover 220 to slide between the first position 231 and the second position 232.

Next, in addition to disposing the positioning element on the guiding element, stopping elements can be further disposed on the base 210 and the slidable cover 220 respectively.

Referring to FIG. 3A to FIG. 3D, they are a view of the pressing action of the stopping elements and schematic views of catching a first catch point 227, a second catch point 228, and a third catch point 229 respectively.

In this embodiment, a plurality of positioning blocks 215 is disposed on the base 210 corresponding to the first position 231 and the second position 232, and a positioning key 226 is disposed on the slidable cover 220 and has a platen 223, a catch element 224, and a resilient element 230.

Figure 3A:
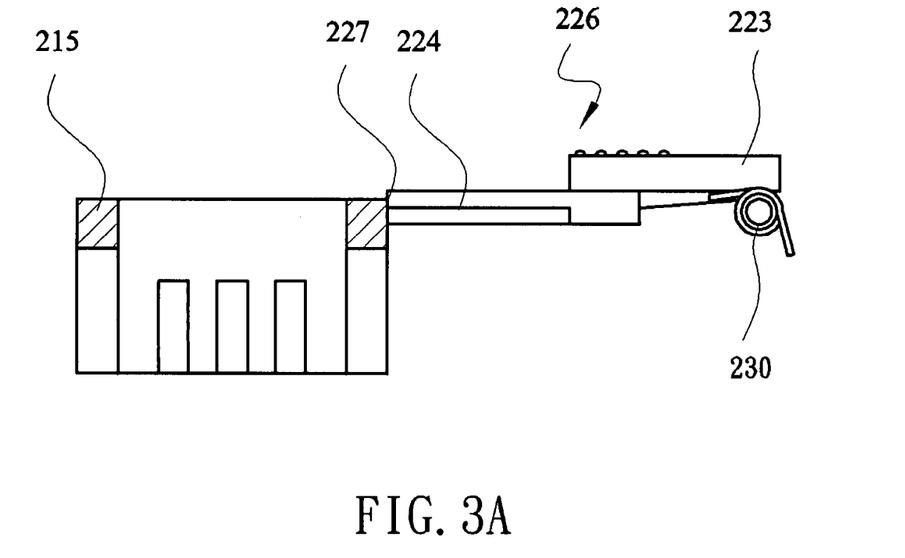
FIG. 3A is a schematic view of catching the first catch point according to the present invention.
Figure 3B:
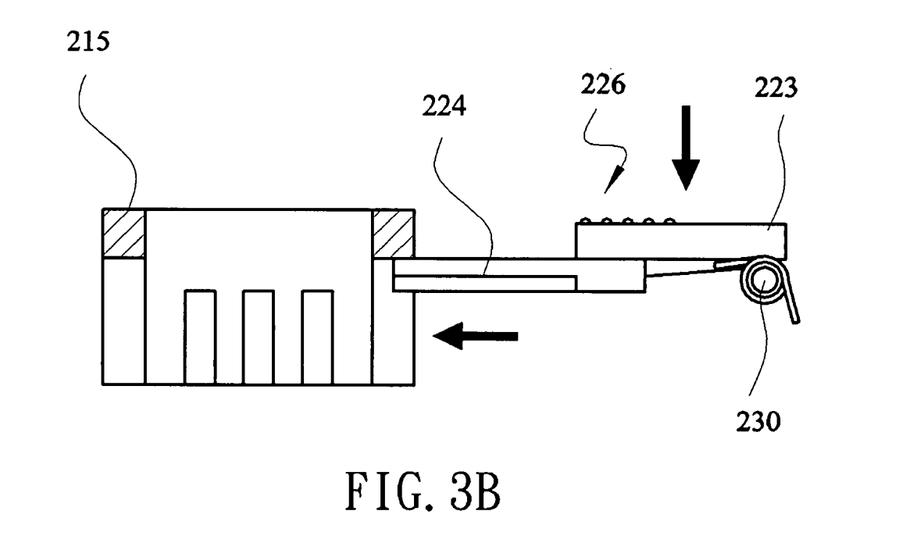
FIG. 3B is a diagram of the pressing action for the stopping element according to the present invention.
Figure 3C:
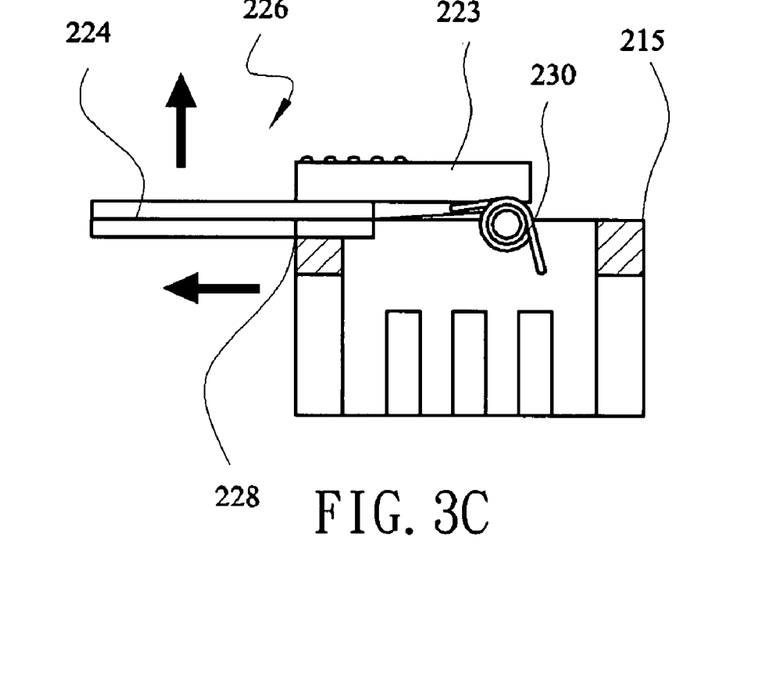
FIG. 3C is a schematic view of catching the second catch point according to the present invention.

When no force is applied to the platen 223, the catch element 224 is caught on the positioning block 215, so as to limit the shift of the slidable cover 220. When a force is applied to the platen 223, the platen 223 drives the catch element 224 to move, so as to release the catch state, and at this time, the slidable cover 220 can slide between the first position 231 (as shown in FIG. 3A) and the second position 232 (as shown in FIG. 3C).

Figure 3D:
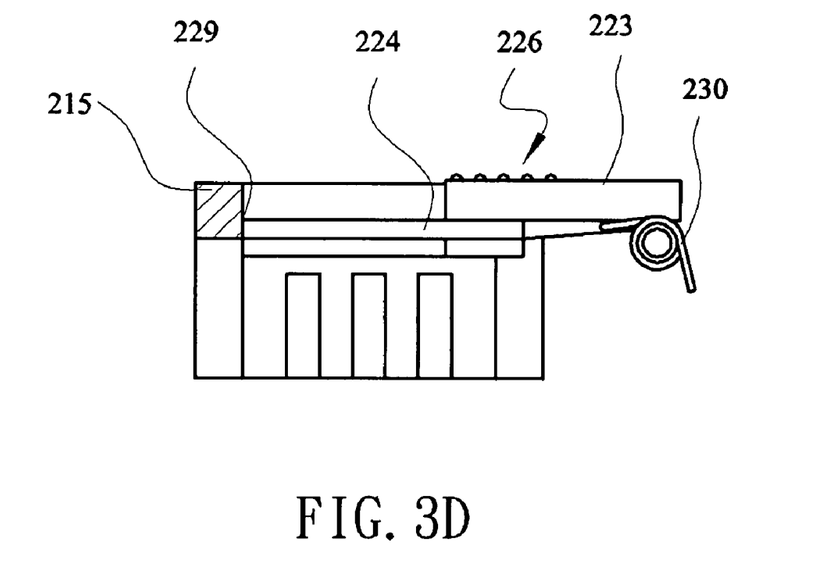
FIG. 3D is a schematic view of catching the third catch point according to the present invention.

For example, when the slidable cover 220 is at the first position 231, the catch element 224 is pressed against the first catch point 227 of the positioning block. If the slidable cover 220 is required to move to the second position 232 or the third position 233 (as shown in FIG. 3D), the platen 223 must be firstly pressed to drive the catch element 224 to move away from the first catch point 227, so as to release the catch state between the positioning key 226 and the positioning block 215. Therefore, the slidable cover 220 is pushed to the second position 232 or the third position 233.

When the slidable cover 220 is at the second position 232, if the platen 223 is released, the catch element 224 is pushed towards the second catch point of the positioning block 215 under the resilience of the resilient element 230, such that the catch element 224 is pressed against the second catch point 228 of the positioning block 215, so as to position the slidable cover 220 at the second position 232. Alternatively, when the slidable cover is at the third position 233, the platen is released, such that the catch element is pressed against the third catch point 229 of the positioning block, so as to position the slidable cover 220 at the third position 233.

In addition, a buckling structure 217 and a positioning structure 218 can be disposed on the notebook computer and the expansion base, so as to enhance the tightness when plugging the expansion base.

Figure 4A:
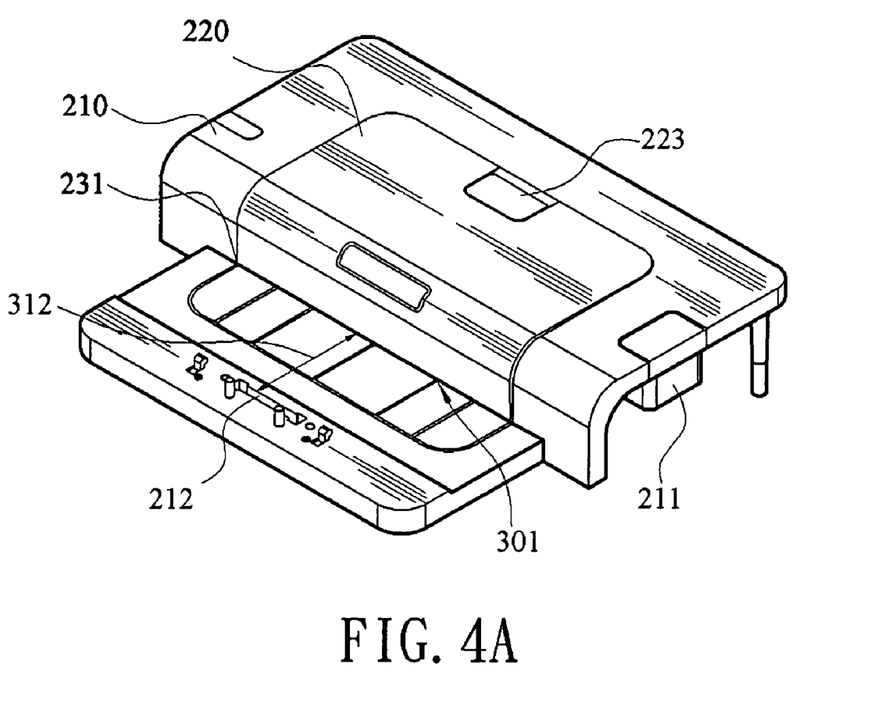
FIG. 4A is a schematic view of the slidable cover at the first position according to the present invention.
Figure 4B:
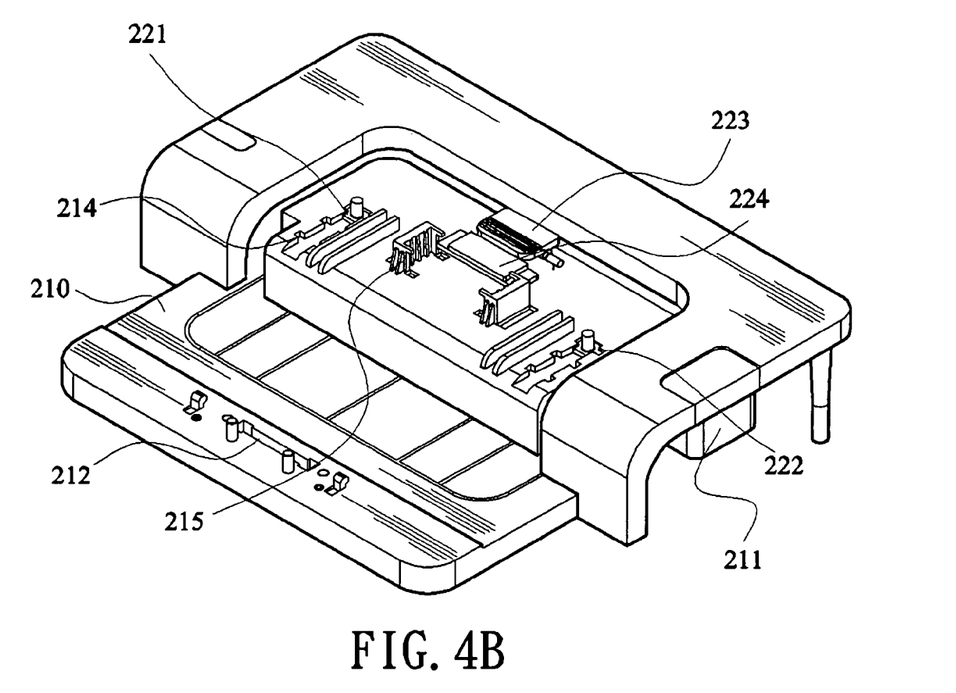
FIG. 4B is a schematic view of the expansion base positioned at the first position according to the present invention.
Figure 4C:
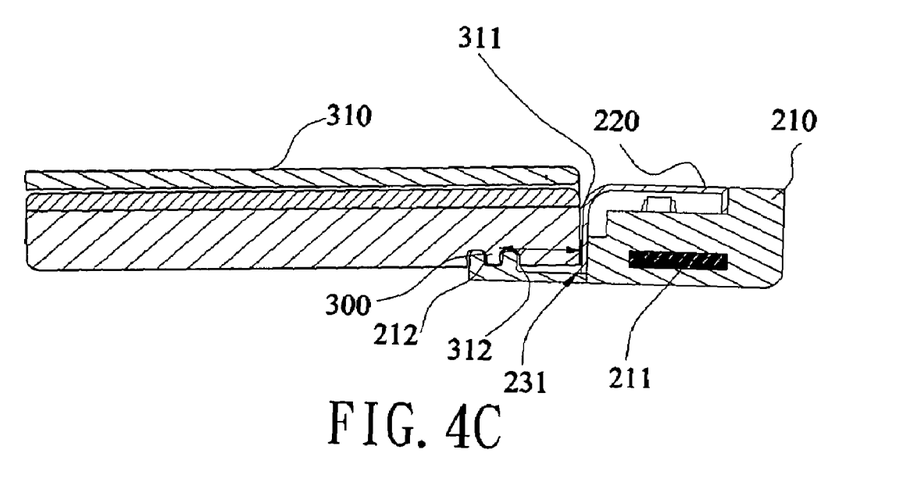
FIG. 4C is a plugging view of the first notebook computer according to the present invention.

Referring to FIG. 4A to FIG. 4C, they are a plugging view of a first notebook computer according to the present invention and schematic views of the slidable cover at the first position. The first notebook computer 310 has an expansion joint 300 and a first plugging reference 311, and the expansion joint 300 and the first plugging reference 311 form a first plugging distance 312.

As for the base 210, when the slidable cover 220 covers, the slidable cover 220 forms a plugging reference line 301 with the plug portion of the base 210. In this embodiment, the slidable cover 220 is located at the first position 231, such that the first plugging distance 312 is formed between the plugging reference line 301 and the expansion slot 212, and the first plugging distance 312 formed by the base 210 is the same as the first plugging distance 312 formed by the first notebook computer 310. Therefore, the expansion joint 300 can be connected to the expansion slot 212, such that the first notebook computer 310 is electrically connected to the expansion component 211. The first plugging reference 311 is corresponding to and presses against the slidable cover 220, such that the expansion base can be closely plugged on the first notebook computer 310. The positioning flange 222 of the guiding block 221 is accommodated within the positioning cavity 214, and one end of the catch element 224 is used to press against one side edge of the positioning block 215, so as to assist to position the slidable cover 220 at the first position 231.

Figure 5A:
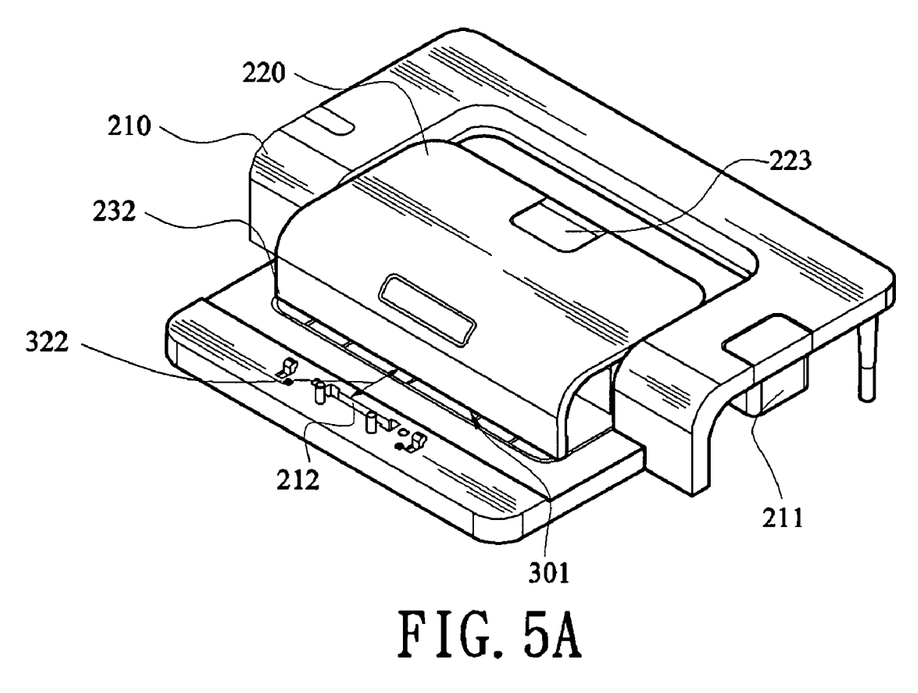
FIG. 5A is a schematic view of the slidable cover at the second position according to the present invention.
Figure 5B:
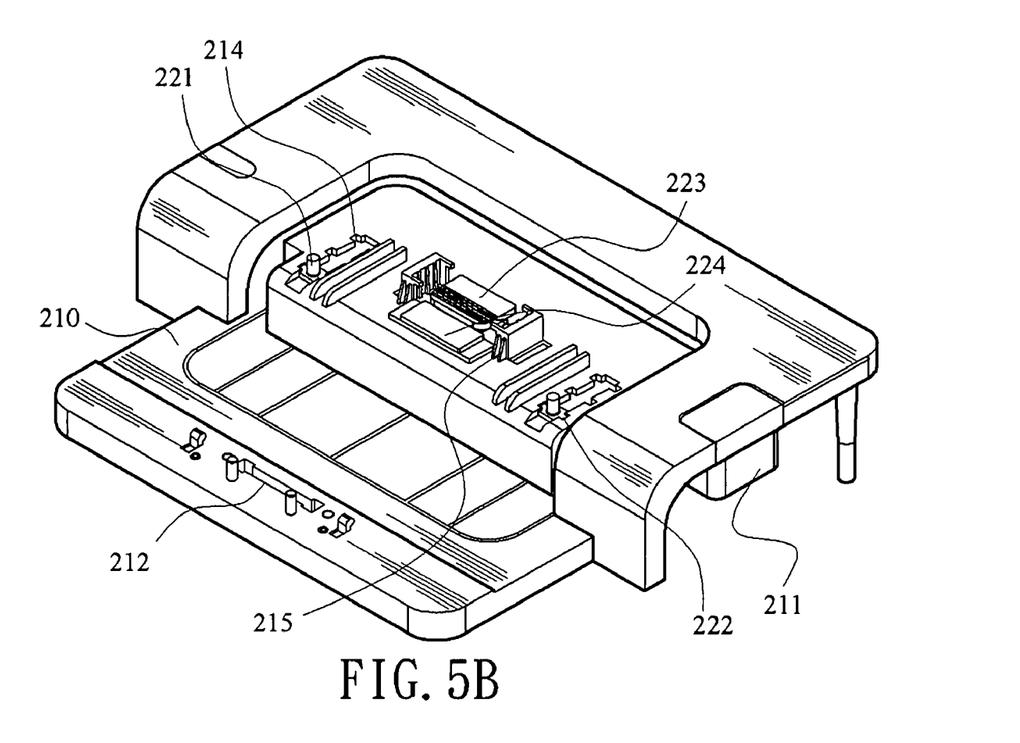
FIG. 5B is a schematic view of the expansion base positioned at the second position according to the present invention.
Figure 5C:
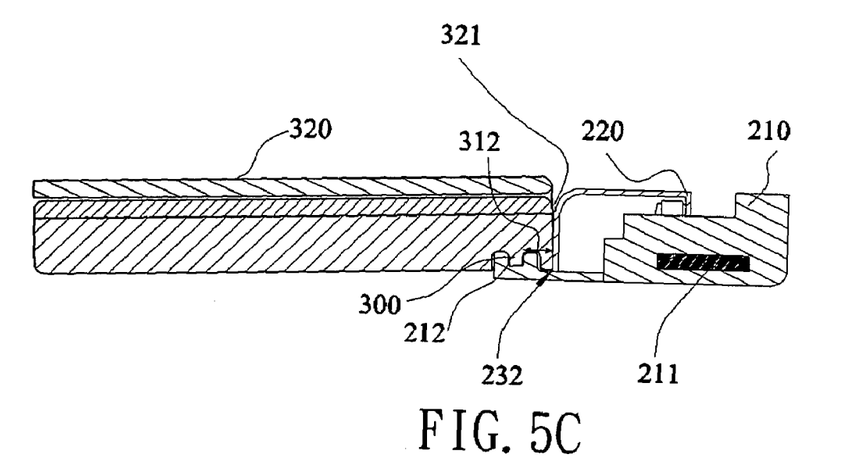
FIG. 5C is a plugging view of the second notebook computer according to the present invention.

Referring to FIG. 5A to FIG. 5C, they are a plugging view of a second notebook computer according to the present invention and schematic views of the slidable cover at the second position. The structure of the second notebook computer 320 is similar to that of the first notebook computer 310, which also has an expansion joint 300 and a second plugging reference 321, the expansion slot 212 and the second plugging reference 321 form a second plugging distance 322. The length of the second plugging distance 322 is less than that of the first plugging distance 312, so that the plug specification of the second notebook computer 320 is known to be different from that of the first notebook computer 310.

In order to match the plug specification of the second notebook computer 320, the slidable cover 220 of the expansion base is slid. First, the platen 223 of the positioning key is pressed, such that the catch element 224 is released from the catch state with the positioning block 215, so as to slide the slidable cover 220. When the slidable cover 220 shifts, the guiding block 221 slides in the guiding rail 220, so as to guide the slidable cover 220 to move to the second position 232, and then, the force applied to the platen 223 is removed, such that the catch element 224 once again catches another side edge of the positioning block 215. Meanwhile, the positioning flange 222 of the guiding block 221 is accommodated in the positioning cavity 214 of the guiding rail 213 to position the slidable cover 220. The plugging reference line 301 is apart from the expansion slot 212 by a second plugging distance 322. The second plugging distance 322 is the same as the second plugging distance 322 formed by the second notebook computer 320, such that the expansion joint 300 can be connected with the expansion slot 212, and the second plugging reference 321 can be corresponding to and pressed against the slidable cover 220, such that the expansion base can be closely plugged on the second notebook computer 320.

Figure 6A:
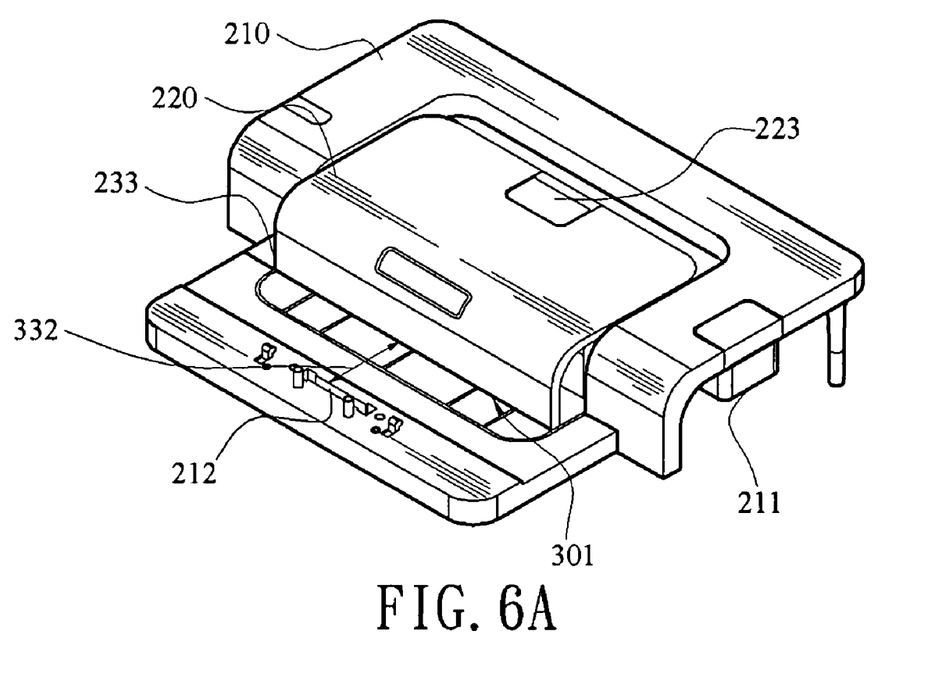
FIG. 6A is a schematic view of the slidable cover at the third position according to the present invention.
Figure 6B:
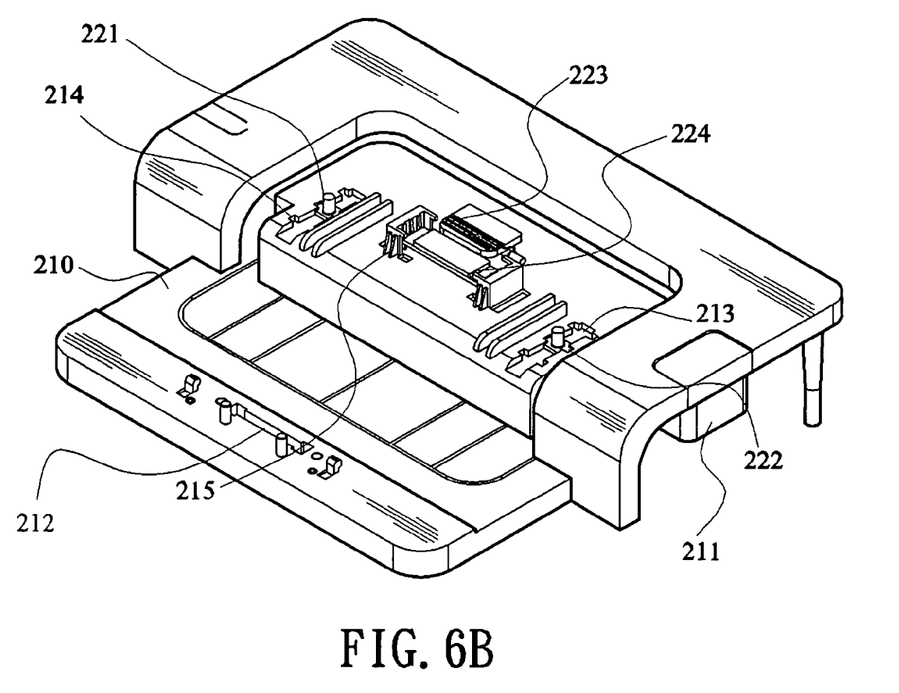
FIG. 6B is a schematic view of the expansion base positioned at the third position according to the present invention.
Figure 6C:
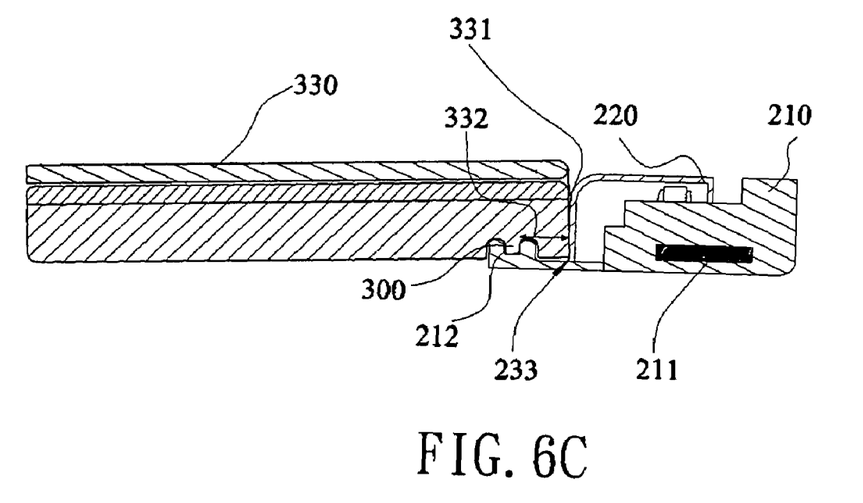
FIG. 6C is a plugging view of the third notebook computer according to the present invention.

Referring to FIG. 6A to FIG. 6C, they are a plugging view of a third notebook computer according to the present invention and schematic views of the slidable cover located at the third position. The third notebook computer 330 also has an expansion joint 300 and a third plugging reference 331, however, a third plugging distance 332 formed between the expansion joint 300 and the third plugging reference 331 is between the first plugging distance 312 and the second plugging distance 322, therefore, the slidable cover 220 is made to slide under the guide of the guiding rail 213 through the abovementioned manner.

However, in this embodiment, an accommodation opening is provided between the positioning blocks 215, when the slidable cover 220 slides to the third position 233, the catch element 224 is located at the accommodation opening of the positioning blocks 215. Meanwhile, upon removing the force applied to the platen 223, the catch element 224 is pressed into the accommodation opening, such that the slidable cover 220 is positioned at the third position 233. Meanwhile, the positioning flange 222 of the guiding block 221 is accommodated in the positioning cavity 214, so as to assist the positioning of the slidable cover 220. At this time, the third plugging distance 332 is formed between the plugging reference line 301 and the expansion slot 212, which is the same as the third plugging distance 332 of the third notebook computer 330, therefore, the expansion slot 212 can be connected with the expansion joint directly 300, and the slidable cover 220 is pressed against the third plugging reference 331.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A notebook computer expansion base with a slidable cover structure, applicable for an expansion of one of a plurality of notebook computers, wherein each of the notebook computers forms with an expansion joint, a plugging reference, and a plugging distance, the plugging distance is a distance between the expansion joint and the plugging reference, at least two of the plurality of notebook computers form with different plugging distances, and the notebook computer expansion base is engaged to the notebook computer corresponding to the plugging reference and the expansion joint, comprising:

a base, for accommodating at least one expansion component;

an expansion slot, disposed in the base and electrically connected to the expansion component, wherein the expansion slot is connected with the expansion joint directly, such that the expansion component is electrically connected to the connected notebook computer; and a slidable cover, disposed on the base and being sildable, corresponding to the plugging reference, wherein the slidable cover slidably moves between a first position and a second position, so as to form different plugging distances from the expansion slot thereby being applicable for the engagement of the notebook computers, wherein the base comprises at least one guiding rail, and the slidable cover comprises at least one guiding block, the position of the guiding rail is corresponding to the position of the guiding block, and the guiding rail is used for accommodating the guiding block for the guiding block to slide therein, so as to guide the slidable cover to slide between the first position and the second position; and wherein the guiding rail comprises a plurality of positioning cavities disposed corresponding to the first position and the second position, and the guiding block comprises at least one positioning flange, when the slidable cover shifts to the first position and the second position, the positioning flange is engaged in a positioning cavity corresponding to the first position, and the positioning flange is engaged in a positioning cavity corresponding to the second position.

2. The notebook computer expansion base as claimed in claim 1, wherein the slidable cover comprises at least one assisting rib, the base comprises at least one assisting rail, a position of the assisting rail is corresponding to a position of the assisting rib, and the assisting rail is used for accommodating the assisting rib for the assisting rib to slide therein, so as to guide the slidable cover to move between the first position and the second position.

3. The notebook computer expansion base as claimed in claim 1, wherein the base comprises a plurality of positioning blocks disposed corresponding to the first position and the second position respectively, the slidable cover comprises a platen and a catch element, and the platen drives the catch element to move between a catch position and a release position upon being applied with a force, wherein when the catch element is at the catch position, the slidable cover is limited to moving between the first position and the second position, and when the catch element is at the release position, the slidable cover is able to move between the first position and the second position.

4. The notebook computer expansion base as claimed in claim 1, wherein the expansion component is an expandable hard disk.

5. The notebook computer expansion base as claimed in claim 1, wherein the expansion component is a serial port hole.

6. The notebook computer expansion base as claimed in claim 1, wherein the expansion component is a battery.

7. The notebook computer expansion base as claimed in claim 1, wherein the expansion component is an optical disc drive.

* * * * *